Patented Sept. 4, 1945

2,384,337

UNITED STATES PATENT OFFICE 2,384,337

MANUFACTURE OF CATALYSTS

Herman Pines and Vladimir N. Ipatieff, Chicago, Ill., assignors to Universal Oil Products Company, Chicago, Ill., a corporation of Delaware No Drawing. Application August 11, 1941,
Serial No. 406,409

4 Claims. (Cl. 252—256)

This invention relates to the manufacture of catalytic material useful in hydrocarbon conversion reactions such as for example in the cracking of heavy distillate fractions of petroleum to produce gasoline, reforming of low antiknock value gasolines to improve their antiknock value, the isomerization of saturated hydrocarbons including paraffins and naphthenes, polymerization reactions among unsaturated hydrocarbons and the alkylation of isoparaffins, naphthenes, or aromatics with olefins or other compounds yielding alkyl groups.

The invention is more specifically concerned with the manufacture of a particular metal halide catalyst of the Friedel-Crafts type, certain of these catalysts having been shown to have value in promoting hydrocarbon conversion reactions of the nature mentioned. The so-called Friedel-Crafts group of catalysts includes as its most important member aluminum chloride, and as members of lesser importance in the case of hydrocarbon conversions the other halides of aluminum, and the chlorides of zirconium, zinc and iron used alone or in admixture with other metal halides which act as modifiers of catalyst activity and usually reduce the activity of the aluminum chloride or the alternative halide so that some reactions may be more accurately controlled.

As a later development in the use of metal halides of the types mentioned to accelerate hydrocarbon conversions, these halides have been utilized on granular supports of various kinds, usually those of a refractory and unreactive character. Such supports include activated carbon, minerals of the clay group including kaolin, bentonite and montmorillonite either raw or acid-treated, natural and synthetic silicates, silica-alumina complexes, the oxides of aluminum and magnesium, crushed fire brick or silica, kieselguhr, etc. Obviously with the alternative possibilities of using different catalytically active metal halides alone in admixture with each other or in admixture with substantially non-catalytic halides and with supporting materials of different chemical and physical characteristics there are many alternative catalyst composites which can be made and which may at times have special value in connection with certain given hydrocarbon reactions.

Furthermore numerous methods of manufacturing supported metal halide catalysts are possible, many of which have been already employed. In the case of metal chlorides such as aluminum chloride which sublimes at 180° C. and zirconium chloride which sublimes at about 300° C., a more or less obvious procedure involves either the heating of a granular support in the metal chloride in a pressure vessel or the passage of the vapors of such compounds into contact with fixed beds of granular supports until a composite approaching saturation with the metal halide has been manufactured. Where a minimum of hydrolysis occurs in the case of aqueous solutions, catalytically active metal halides may be deposited on suitable supports by the evaporation of the aqueous solutions or by suspending granular supports in solutions of salts from which the latter are absorbed at normal or elevated temperatures. The present invention is the contribution to the art of preparing highly effective catalytic composites of the mixed metal halide variety.

In one specific embodiment the present invention comprises a process for making composite catalysts comprising essentially aluminum chloride and zirconium chloride on supports by treating a composite of the supported oxides of aluminum and zirconium with phosgene or with chlorine and a reducing gas such as for example carbon monoxide.

A characteristic equation representing the formation of the mixed chlorides of aluminum and zirconium by the present process is given as follows:

$$Al_2O_3.ZrO_2 + 5COCl_2 \rightarrow 2AlCl_3.ZrCl_4 + 5CO_2$$

In preparing supported aluminum oxide and zirconium oxide for treatment with our present process to produce hydrocarbon conversion catalysts, a number of procedures may be employed depending upon the type of support used and the method of adding the mixed oxides thereto. In one method of operation a granular supporting material may be suspended in a solution of mixed salts of aluminum and zirconium, for example, the chlorides or sulfates and a certain amount of the hydrated oxides deposited upon the granules by heating the solution and effecting a certain degree of hydrolysis of the salts. Another method involves the adding of alkaline precipitants to the solutions containing the suspended granules to precipitate the hydrated oxides. In other instances the nitrates of aluminum and zirconium may be mixed with granules of a support and the mixture calcined to drive off the acid radicals and leave a residue of aluminum oxide and zirconium oxide. In some instances simple mechanical mixture may be resorted to or the precipitated hydrogels of alumina and zirconia may be mixed with hydrogels of supporting materials such as for example the hydrogel of silica precipitated by the acidification of water glass solutions, the mixed hydrogels being dried, washed and calcined to form a composite comprising essentially silica-alumina and/or zirconia.

In forming the mixed chlorides of aluminum and zirconium, composites containing the corresponding oxides are subjected to contact with phosgene or the alternatively utilizable gas mixtures mentioned. It is customary practice to place the composites containing the supported oxides either in a pressure vessel to which the phosgene or other mixture of gases is added or to place the composite granules in a stationary bed in a reactor and pass the gas mixtures therethrough under controlled conditions of temperature, pressure and flow rates. It is usually unnecessary to employ superatmospheric pressures when operating according to the last-named method and the only precaution necessary to observe in the matter of temperature is to hold it below the sublimation point of aluminum chloride. Flow rates will depend upon the relative proportions of aluminum and zirconium oxides present, the weight ratio of these oxides to the support and the size and absorptive capacity of the supporting granules.

As alternatives to the use of phosgene, mixtures of carbon monoxide and chlorine may be employed or mixtures of chlorine and other reducing agents such as for example hydrogen, light paraffin gases or flue gas.

The following example is given to illustrate the methods of operation and the results normally obtained in the manufacture and use of catalysts of the present type although not with the intention of unduly limiting the proper scope of the invention.

A composite is prepared consisting of about 70% by weight of silica, 20% by weight of aluminum oxide and 10% by weight of zirconium oxide by the method of precipitating the proportioned hydrated oxides of aluminum and zirconium on suspended granules of silica hydrogel in a solution of aluminum and zirconium chlorides. Ammonium hydroxide is added to the salt solution in an amount necessary to precipitate the required amounts of alumina and zirconia and the total suspended material is then filtered and washed to substantially completely remove sodium salts after which the filter cake is dried and calcined at a temperature of about 550° C. The composite particles are sized to secure those of about 10 to about 30 mesh for treatment. These particles are placed in a vertical cylindrical reactor and phosgene is passed therethrough to substantially complete conversion of the mixed oxides to the mixed chlorides.

The prepared catalyst is utilized in the same chamber in which it was manufactured for the isomerization of normal butane which is effected by passing normal butane through the composite catalyst at a temperature of 90° C. and a pressure of 200 pounds per square inch at a liquid hourly space velocity of four. In a single pass, 30% of the normal butane is isomerized into isobutane.

We claim as our invention:

1. A process for the manufacture of catalysts which comprises forming a mixture of the hydrogels of silica, alumina and zirconia, drying said mixture, treating the dried mixture with a gas comprising chlorine and a reducing agent to form aluminum and zirconium chlorides, and effecting said treatment under temperature and pressure conditions regulated to retain said chlorides on the silica.

2. The process of claim 1 further characterized in that said reducing agent comprises carbon monoxide.

3. The process of claim 1 further characterized in that said reducing agent comprises hydrogen.

4. The process of claim 1 further characterized in that said gas comprises phosgene.

HERMAN PINES.
VLADIMIR N. IPATIEFF.